US010253384B2

(12) United States Patent
Kondo et al.

(10) Patent No.: US 10,253,384 B2
(45) Date of Patent: Apr. 9, 2019

(54) COLD-ROLLED STEEL SHEET, PLATED STEEL SHEET, AND METHOD FOR MANUFACTURING THE SAME (71) Applicant: NIPPON STEEL & SUMITOMO METAL CORPORATION, Tokyo (JP)

(72) Inventors: Yusuke Kondo, Tokyo (JP); Kunio Hayashi, Tokyo (JP); Toshio Ogawa, Tokyo (JP); Naoki Matsutani, Tokyo (JP); Koichi Goto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/373,748

(22) PCT Filed: Feb. 6, 2013

(86) PCT No.: PCT/JP2013/052762
§ 371 (c)(1),
(2) Date: Jul. 22, 2014

(87) PCT Pub. No.: WO2013/121953
PCT Pub. Date: Aug. 22, 2013

(65) Prior Publication Data
US 2014/0352850 A1 Dec. 4, 2014

(30) Foreign Application Priority Data

Feb. 13, 2012 (JP) ................................. 2012-028271

(51) Int. Cl.
C21D 8/02 (2006.01)
C22C 38/04 (2006.01)
C22C 38/06 (2006.01)
C22C 38/08 (2006.01)
C22C 38/12 (2006.01)
C22C 38/14 (2006.01)
C22C 38/16 (2006.01)
C22C 38/20 (2006.01)
C22C 38/22 (2006.01)
C22C 38/26 (2006.01)
C22C 38/28 (2006.01)
C22C 38/38 (2006.01)
C22C 38/44 (2006.01)
C22C 38/50 (2006.01)
B32B 15/01 (2006.01)
C22C 38/02 (2006.01)
C23C 2/02 (2006.01)
C23C 2/28 (2006.01)
C21D 9/46 (2006.01)
C22C 38/00 (2006.01)
(Continued)

(52) U.S. Cl.
CPC .......... *C21D 8/0205* (2013.01); *B32B 15/013* (2013.01); *C21D 8/0278* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/26* (2013.01); *C22C 38/28* (2013.01); *C22C 38/38* (2013.01); *C22C 38/44* (2013.01); *C22C 38/50* (2013.01); *C23C 2/02* (2013.01); *C23C 2/06* (2013.01); *C23C 2/28* (2013.01); *C23C 2/40* (2013.01); *Y10T 428/12799* (2015.01)

(58) Field of Classification Search
None
See application file for complete search history.

(56) References Cited

U.S. PATENT DOCUMENTS

| 6,248,191 | B1 * | 6/2001 | Luton ...................... C21D 1/19 148/653 |
| 2004/0202889 | A1 * | 10/2004 | Fujita ........................ C23C 2/02 428/659 |
| 2011/0186189 | A1 * | 8/2011 | Futamura .................. C23C 2/02 148/622 |

FOREIGN PATENT DOCUMENTS

| CN | 1386140 A | 12/2002 |
| JP | 2008-106352 A | 5/2008 |
| JP | 2008-156680 A | 7/2008 |
| JP | 2008-190032 A | 8/2008 |
| JP | 2009-114523 A | 5/2009 |
| JP | 2010-248601 A | 11/2010 |
| JP | 2010-285656 A | 12/2010 |

(Continued)

OTHER PUBLICATIONS

Chinese Office Action and Search Report dated Oct. 21, 2015, for Chinese Application No. 201380008773.8 with the English translation of the Search Report.

(Continued)

*Primary Examiner* — Jenny R Wu
(74) *Attorney, Agent, or Firm* — Birch, Stewart, Kolasch & Birch, LLP (57) ABSTRACT A cold-rolled steel sheet includes, by mass %: C: 0.020% or more and 0.080% or less; Si: 0.20% or more and 1.00% or less; Mn: 0.80% or more and 2.30% or less; and Al: 0.010% or more and 0.100% or less; and further includes: one or more of Nb and Ti which satisfy a requirement of 0.005%≤Nb+Ti<0.030%, in which a structure consists of, ferrite, bainite, and other phases, an area ratio of the ferrite is 80% or more and less than 95%, an area ratio of a non-recrystallization ferrite in the ferrite is 1% or more and less than 10%, an area ratio of the bainite is 5% or more and 20% or less, a total amount of the other phases is less than 8%, an equivalent circle diameter of a carbonitride including one or both of Nb and Ti is 1 nm or more and 10 nm or less, and a tensile strength is 590 MPa or more.

6 Claims, 4 Drawing Sheets (51) Int. Cl.
   *C22C 38/18* (2006.01)
   *C23C 2/40* (2006.01)
   *C23C 2/06* (2006.01)

(56) References Cited

FOREIGN PATENT DOCUMENTS

| | | |
|---|---|---|
| JP | 2010-285667 A | 12/2010 |
| JP | 2011-241430 A1 | 12/2011 |
| WO | WO 2011/126064 A1 | 10/2011 |
| WO | WO2012/014926 A1 | 2/2012 |

OTHER PUBLICATIONS

Extended European Search Report dated Oct. 23, 2015, for European Application No. 13748796.3.
International Search Report issued in PCT/JP2013/052762, dated May 14, 2013.

* cited by examiner

COLD-ROLLED STEEL SHEET, PLATED STEEL SHEET, AND METHOD FOR MANUFACTURING THE SAME

TECHNICAL FIELD OF THE INVENTION

The present invention relates to a high-strength cold-rolled steel sheet and a plated steel sheet, which have excellent ductility and stretch flangeability and are suitable for an automobile steel sheet, particularly suitable for a structural member (for example, a bracket), and a method for manufacturing the same.

Priority is claimed on Japanese Patent Application No. 2012-028271, filed on Feb. 13, 2012, the content of which is incorporated herein by reference.

RELATED ART

In recent years, in order for automakers to cope with the tightening of $CO_2$ emission regulations in Europe in 2012, fuel economy regulations in Japan in 2015, and stricter collision regulations in Europe, high-strengthening of steel to be used has rapidly progressed to improve fuel economy through a decrease in the weight of an automobile body and improve collision safety. Such a high-strength steel sheet is called a "high tensile strength steel sheet", and the amount of orders of thin steel sheets mainly having a tensile strength of 440 MPa to 590 MPa, and recently more than 590 MPa, tends to increase every year. Among them, excellent ductility and stretch flangeability are demanded for a structural member such as a bracket in view of the working method. Generally, it is considered that when the product of tensile strength and total elongation is 17000 MPa·% or more, ductility is excellent and, regarding a grade of 590 MPa of tensile strength, when hole expansion ratio is 80% or more, stretch flangeability is excellent.

Generally, when tensile strength increases, yield strength also increases. Thus, ductility is decreased, and further, stretch flange formability is deteriorated. In the related art, in a case of dual phase (DP) steel including two phases of ferrite and martensite, the ductility is excellent, but micro-cracks caused by local strain concentration in the vicinity of a boundary between ferrite which is a soft phase and martensite which is a hard phase easily occur and propagate, and thus, it is considered that the dual phase is a disadvantageous microstructure in hole expansibility. Accordingly, it is considered that the smaller the hardness difference between the microstructures is, the more advantageous it is in hole expansibility improvement, and thus, a steel sheet having a uniform structure such as ferrite single phase steel or bainite single phase steel is considered to be superior. From the above viewpoint, it is important to control a constituent phase fraction matched with a desired tensile strength to attain both ductility and hole expansibility.

As a high-strength steel sheet in which both of ductility and stretch flangeability are attained, a steel sheet in which precipitation strengthening is actively utilized has been proposed so far (for example, refer to Patent Documents 1 and 2).

However, since the cold-rolled steel sheet proposed in Patent Document 1 is mostly annealed almost within a ferrite single phase region, structure strengthening by bainite is hardly utilized. Thus, in order to facilitate high-strengthening, a large amount of Ti and precipitation elements other than Ti have to be added to actively utilize precipitation strengthening. Subsequently, a higher alloy cost is required. In addition, precipitation elements such as Ti and Nb also function as recrystallization inhibiting elements, and thus, when these elements are added in a large amount, recrystallization is remarkably delayed in annealing. Accordingly, in order to have the area ratio of non-recrystallization ferrite of 25% or less, it is assumed that a temperature rising rate needs to become extremely slow in the annealing step or that a holding time at the maximum heating temperature needs to become extremely long, and thus, productivity is deteriorated. In addition, since precipitation strengthening is actively utilized in a cold-rolled steel sheet proposed in Patent Document 2 as in Patent Document 1, a large amount of Ti and precipitation elements other than Ti have to be added to the cold-rolled steel sheet proposed in Patent Document 2. Subsequently, a higher alloy cost is required and also when these elements are added in a large amount, recrystallization is remarkably delayed in annealing. Thus, in order to have the area ratio of non-recrystallization ferrite of 25% or less, the maximum heating temperature in the annealing step becomes extremely high. Alternatively, when the maximum heating temperature is just higher than an $Ac_1$ transformation temperature, a temperature rising rate becomes extremely slow. Alternatively, it is assumed that a holding time at the maximum heating temperature needs to become extremely long, and thus, productivity is deteriorated.

In addition, a steel sheet having improved stretch flangeability by actively utilizing non-recrystallization ferrite to reduce the hardness difference between ferrite and a hard phase has been proposed (for example, refer to Patent Documents 3 to 5).

However, since it is necessary to add a large amount of recrystallization inhibiting elements such as Nb and Ti to actively utilize non-recrystallization ferrite, a higher alloy cost is required and also a temperature rising rate needs to be increased in an annealing step. Thus, facility investment is needed.

PRIOR ART DOCUMENT

Patent Document

[Patent Document 1] Japanese Unexamined Patent Application, First Publication No. 2010-285656
[Patent Document 2] Japanese Unexamined Patent Application, First Publication No. 2010-285657
[Patent Document 3] Japanese Unexamined Patent Application, First Publication No. 2008-106352
[Patent Document 4] Japanese Unexamined Patent Application, First Publication No. 2.008-190032
[Patent Document 5] Japanese Unexamined Patent Application, First Publication No. 2009-114523

DISCLOSURE OF THE INVENTION

Technical Problem

The present invention is to stably provide a high-strength cold-rolled steel sheet and a plated steel sheet which have excellent ductility and stretch flangeability, without deterioration in productivity.

Solution to Problem

The present invention is a finding obtained from an investigation that has been conducted to solve the above mentioned problems of improving ductility and stretch flangeability of a high-strength cold-rolled steel sheet, a hot-dip galvanized steel sheet, and a galvannealed steel sheet which have a tensile strength of 590 MPa or more. That is, an appropriate microstructure is attained by optimizing the amount of alloying elements, particularly, optimizing the amount of Nb, and Ti and positively adding Si. In addition, in an annealing process, the maximum heating temperature is controlled within a temperature range of $Ac_1$ [° C.] or more and $(Ac_1+40)$ [° C.] or less and an end temperature and a cooling rate of a primary cooling after annealing are determined. Accordingly, a sufficient recrystallization suppressing effect can be obtained, and thus, while utilizing bainite, the amount of non-recrystallization ferrite is appropriately controlled by controlling an equivalent circle diameter of the carbon including one or both of Nb and Ti to fine. The present invention is made based on the findings that it is possible to produce a steel sheet having excellent ductility and stretch flangeability compared to steel sheets of the related art, and the summary thereof is described as follows.

(1) According to a first aspect of the present invention, there is provided a cold-rolled steel sheet including, by mass %: C: 0.020% or more and 0.080% or less; Si: 0.20% or more and 1.00% or less; Mn: 0.80% or more and 2.30% or less; P: 0.0050% or more and 0.1500% or less; S: 0.0020% or more and 0.0150% or less; Al: 0.010% or more and 0.100% or less; N: 0.0010% or more and 0.0100% or less; and further including: one or more of Nb and Ti which satisfy a requirement of 0.005%≤Nb+Ti<0.030%; and a reminder including Fe and unavoidable impurities, in which a structure consists of, a ferrite, a bainite, and an other phase, the other phase includes a pearlite, a residual austenite, and a martensite, an area ratio of the ferrite is 80% or more and less than 95%, an area ratio of a non-recrystallization ferrite in the ferrite is 1% or more and less than 10%, an area ratio of the bainite is 5% to 20%, a total amount of the other phase is less than 8%, an equivalent circle diameter of a carbonitride including one or both of Nb and Ti is 1 nm or more and 10 nm or less, and a tensile strength is 590 MPa or more.

(2) The cold-rolled steel sheet according to (1) may further include one or more of, by mass %; Mo: 0.005% or more and 1.000% or less; W: 0.005% or more and 1.000% or less; V: 0.005% or more and 1.000% or less; B: 0.0005% or more and 0.0100% or less; Ni: 0.05% or more and 1.50% or less; Cu: 0.05% or more and 1.50% or less; and Cr: 0.05% or more and 1.50% or less.

(3) According to a second aspect of the present invention, there is provided a plated steel sheet in which plating is provided on a surface of the cold-rolled steel sheet according to (1) or (2).

(4) According to a third aspect of the present invention, there is provided a method for manufacturing a cold-rolled steel sheet including: heating a slab having a chemical composition according to (1) or (2) to 1150° C. or more and 1280° C. or less; finishing a finish rolling under a temperature of $Ar_3$° C. or more and 1050° C. or less; pickling and then cold-rolling a hot-rolled steel sheet, which is coiled under a temperature range of 450° C. or more and 650° C. or less, under a reduction of 40% or more and 70% or less; thereafter heating into a temperature range of $Ac_1$° C. or more and $(Ac_1+40)$° C. or less under a rate of 2° C./sec or more and 5° C./sec or less; annealing the cold-rolled steel sheet under the temperature range of $Ac_1$° C. or more and $(Ac_1+40)$° C. or less and for a holding time of 10 sec or more and 200 sec or less; and primary cooling immediately after the annealing into a steel sheet temperature range of 600° C. or more and 720° C. or less under a cooling rate of 10° C./sec or less in a course from the annealing to arriving at a normal temperature, in which the $Ar_3$° C. and the $Ac_1$° C. is a $Ar_3$ transformation temperature and a $Ac_1$ transformation temperature, respectively, calculated from Expressions 1 and 2, $$Ar_3=910-325\times[C]+33\times[Si]+287\times[P]+40\times[Al]-92\times([Mn]+[Mo]+[Cu])-46\times([Cr]+[Ni]) \quad \text{(Expression 1)}.$$

$$Ac_1=723+212\times[C]-10.7\times[Mn]+29.1\times[Si] \quad \text{(Expression 2), and}$$

elements noted in brackets represents an amount of the elements by mass %, respectively.

(5) According to a fourth aspect of the present invention, there is provided a method for manufacturing a plated steel sheet including plating the cold-rolled steel sheet manufactured by the method according to (4) after the annealing and the cooling.

(6) The method for manufacturing a plated steel sheet according to (5) may further include heat treating the plated steel sheet under a temperature range of 450° C. or more and 600° C. or less with 10 seconds or longer.

Effects of the Invention

According to the present invention, it is possible to provide a high-strength cold-rolled steel sheet, a hot-dip galvanized steel sheet, and a galvannealed steel sheet which have a tensile strength of 590 MPa or more, and excellent ductility and stretch flangeability. Therefore, the present invention makes an extremely significant contribution to the industry.

EMBODIMENTS OF THE INVENTION

Hereinafter, the present invention will be described in detail.

First, the reasons why steel components are limited in the present invention will be described.

C is an element which contributes to an increase in tensile strength and yield strength, and added in appropriated amounts according to a targeted strength level. In addition, C is also effective in obtaining bainite. When the amount of C is less than 0.020%, it is difficult to obtain a target tensile strength and yield strength, and thus, the lower limit is set to 0.020%. On the other hand, when the amount of C is more than 0.080%, deterioration in the ductility, hole expansibility, and weldability is caused. Thus, the upper limit is set to 0.080%. In addition, in order to stably secure the tensile strength and yield strength, the lower limit of C may be preferably 0.030% or 0.040%, and the upper limit of C may he preferably 0.070% or 0.060%.

Si is an extremely important element in the present invention. Si is effective in improving the stretch flangeability by hardening ferrite through solid solution strengthening to reduce the hardness difference with a hard phase. In order to obtain the effect, it is necessary to set the amount of Si to 0.20% or more, and thus, the lower limit is set to 0.20%. On the other hand, Si may cause a problem of a decrease in plating wettability when hot dip galvanizing is carried out and a problem of a decrease in productivity due to the delay of alloying reaction. Therefore, the upper limit of the amount of Si is set to 1.00%. In addition, Si is a ferrite stabilizing element. The lower limit of Si may be set to 0.30% or 0.40% and the upper limit of Si may be set to 0.90% or 0.80% to obtain an appropriate amount of bainite.

Mn acts as an element that contributes to solid solution strengthening, and thus has an effect of increasing the strength. In addition, Mn is effective in obtaining beinite. In addition, it is necessary to contain 0.80% or more of Mn to improve hole expansibility. On the other hand, when the amount of Mn is more than 2.30%, deterioration in hole expansibility and weldability is caused, and thus, the upper limit thereof is set to 2.30%. In addition, in order to stably obtain bainite the lower limit of Mn may be set to 1.00%, 1.20%, or 1.80%, and the upper limit of Mn may be set to 2.10%, or 2.00%.

P is an impurity, and is segregated at grain boundaries to cause a decrease in the toughness of the steel sheet and deterioration in the weldability. Further, the alloying reaction becomes extremely slow during hot dip galvanizing, and the productivity is degraded. From the viewpoints, the upper limit of the amount of P is set to 0.1500%. Since P is an element which increases strength at a low price, the lower limit of the amount of P is preferably set to 0.0050% or more. In order to further improve the toughness and the weldability, the lower limit of P may be set to 0.0060% or 0.0070%, and the upper limit of P may be set to 0.1000% or 0.0850%.

S is an impurity and when where the content thereof is more that 0.0150%, hot cracking is induced or workability is deteriorated. Thus, the upper limit of the amount of S is set to 0.0150%. Due to restriction on production costs, the lowver limit of the amount of S is set to 0.0020%. In order to improve the workability, the lower limit of S may be set to 0.0025%, and the upper limit of S may be set to 0.0100% or 0.0080%.

Al is a ferrite stabilizing element similar to Si. Al is a deoxidizing element and the lower limit is set to 0.010% or more in view of deoxidation. In addition, excessive addition of Al causes deterioration in the weldability, and thus, the upper limit thereof is set to 0.100%. The lower limit of Al may be set to 0.015% or 0.025%, and the upper limit of Al may be set to 0.080%, 0.060% or 0.040%.

N is an impurity. When the amount of N is more than 0.0100%, deterioration in toughness and ductility and occurrence of cracking in a slab are significant. Since N is effective in increasing tensile strength and yield strength, similar to C, N may be positively added as the upper limit of the amount of N is set to 0.0100%. In addition, N is effective in obtaining bainite. Due to restriction on production costs, the lower limit of the amount of N is set to 0.0010%. The lower limit of N may be set to 0.0020% or 0.0030%, and the upper limit of N may be 0.0080%, 0.0060%, or 0.0050%.

Further, Nb and Ti are extremely important elements in the present invention. These elements have an effect of delaying the progress of recrystallization in an annealing process to allow non-recrystallization ferrite to remain. Since the non-recrystallization ferrite contributes to hardening of ferrite, the amount of the non-recrystallization ferrite is appropriately controlled to reducing the hardness difference between ferrite and the hard phase, thereby obtaining an effect of improving the stretch flangeability. When one or more of Nb and Ti are contained so as to satisfy the condition of $0.005\% \leq Nb+Ti < 0.030\%$, the reason why the upper limit of at least one of Nb and Ti is less than 0.030% is that when one or more of Nb and Ti are added at a content more than the upper limit, the non-recrystallization ferrite remains excessively, and the ductility is decreased. In addition, the reason why the lower limit of one or more of Nb and Ti are set to 0.005% is that when one or more of Nb and Ti are added at a content less than the lower limit, a recrystallization suppressing effect is small, and the non-recrystallization ferrite hardly remains. In addition, in order to improve the stretch flangeability, the lower limit of one or more of Nb and Ti may be set to 0.010%, and the upper limit of one or more of Nb and Ti may be set to 0.025%.

All of Mo, W, and V are recrystallization inhibiting elements, and one or more of these elements may be added as required. In order to obtain the effect of strength improvement, 0.005% of Mo, 0.005% of W, and 0.005% of V are preferably added respectively as the lower limits. On the other hand, since excessive addition causes an increase in an alloy cost, the upper limits are preferably set to 1.000% of Mo, 1.000% of W, and 1.000% of V, respectively.

All of B, Ni, Cu, and Cr are elements which increase hardenability, and one or more of these elements may be added as required. In order to obtain the effect of strength improvement, 0.0005% of B, 0.05% of Ni, 0.05% of Cu, and 0.05% of Cr are preferably added respectively as the lower limits. On the other hand, since excessive addition causes an increase in an alloy cost, the upper limits are preferably set to 0.0100% of B, 1.50% of Ni, 1.50% of Cu, and 1.50% of Cr, respectively.

The high-strength cold-rolled steel sheet containing the above-described chemical composition may contain impurities unavoidably incorporated in a production process within the range in which a reminder including iron as a main component does not impair the properties of the present invention.

Next, the reasons why a production method is limited will be described.

A slab having the above-described composition is heated at a temperature of 1150° C. or higher. The slab may be a slab immediately after being produced by a continuous casting facility or a slab produced by an electric furnace. The reason why the temperature is limited to 1150° C. or higher is to sufficiently decompose and dissolve carbonitride forming elements and carbon in the steel. In order to dissolve the precipitated carbonitrides, the temperature is preferably 1200° C. or higher. However, when the heating temperature is higher than 1280° C., the temperature is not preferable in view of production costs, and thus, 1280° C. is preferably set as the upper limit.

When a finishing temperature in hot rolling is lower than an $Ar_3$ transformation temperature, carbonitrides are precipitated and the particle size is coarsened in the surface area, and the tensile strength and stretch flangeability are decreased after the annealing, so that the $Ar_3$ transformation temperature is set as the lower limit. A temperature of 900° C. or higher is preferable to stably precipitate the precipitates of carbonitrides with an equivalent circle diameter of 10 nm or less. The upper limit of the finishing temperature is substantially 1050° C. in view of the slab heating temperature.

Here, $Ar_3°$ C. is an $Ar_3$ transformation temperature obtained by the following Expression 1.

$$Ar_3=910-325\times[C]+33\times[Si]+287\times[P]+40\times[Al]-92\times([Mn]+[Mo]+[Cu])-46\times([Cr]+[Ni]) \quad \text{(Expression 1)}$$

Wherein, elements noted in brackets represent an amount of the elements by mass %, respectively.

A coiling temperature after finishing rolling is an extremely important production condition in the present invention. In the present invention, the suppression of the precipitation of carbonitrides at the stage of the hot-rolled steel sheet with setting the coiling temperature to 650° C. or lower is important, and the properties of the present is not deteriorated by the history up to that time. When the coiling temperature is higher than 650° C., carbonitrides are precipitated and coarsened in the hot-rolled steel sheet, sufficient crystallization suppressing effects cannot be attained during annealing, and thus, 650° C. is set as the upper limit. Further, when the coiling temperature is lower than 450° C., the strength of the hot-rolled steel sheet is increased and rolling load is increased during cold rolling. Therefore, 450° C. is set as the lower limit.

Cold rolling after typical pickling is carried out under at reduction of 40% to 70%. When the reduction is less than 40%, the driving force of recrystallization becomes small during the annealing, and thus, non-recrystallization ferrite remains excessively after the annealing, which causes a decrease in the ductility. Thus, the lower limit is set to 40%. In addition, when the reduction is more than 70%, the driving force of recrystallization becomes large during the annealing, and thus, a small amount of non-recrystallization ferrite remains, which causes a decrease in the tensile strength and the stretch flangeability. Therefore, the upper limit is set to 70%.

Figure 1:
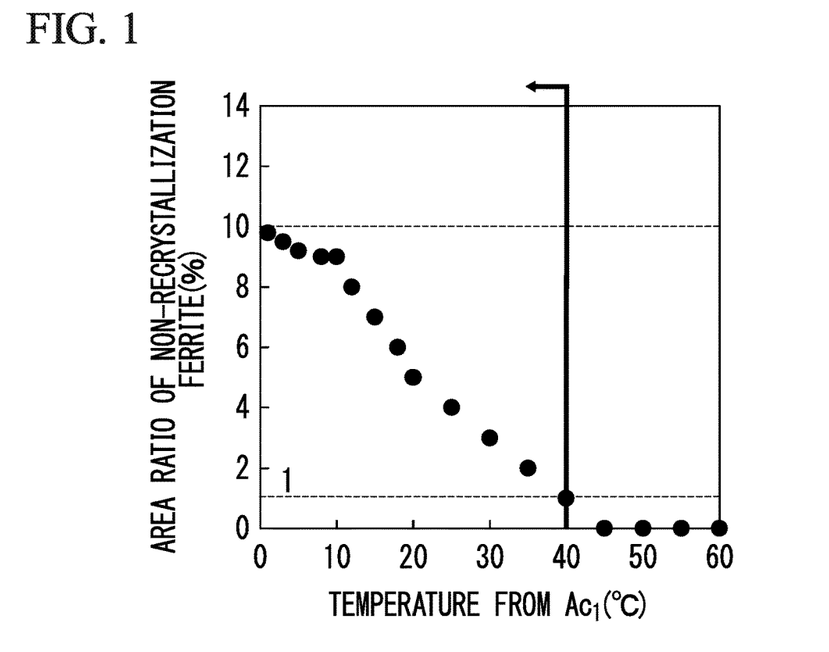
FIG. 1 is a graph showing a relationship between the maximum heating temperature, particularly, an $Ac_1$ transformation point or higher, in annealing and an area ratio of non-recrystallization ferrite.
Figure 2:
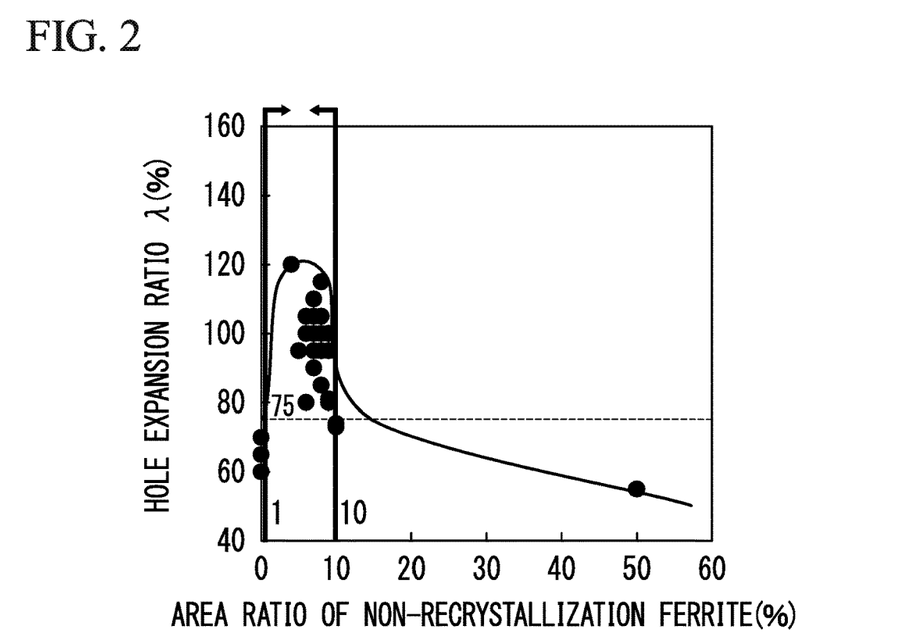
FIG. 2 is a graph showing a relationship between an area ratio of non-recrystallization ferrite and a hole expansion ratio λ.
Figure 3:
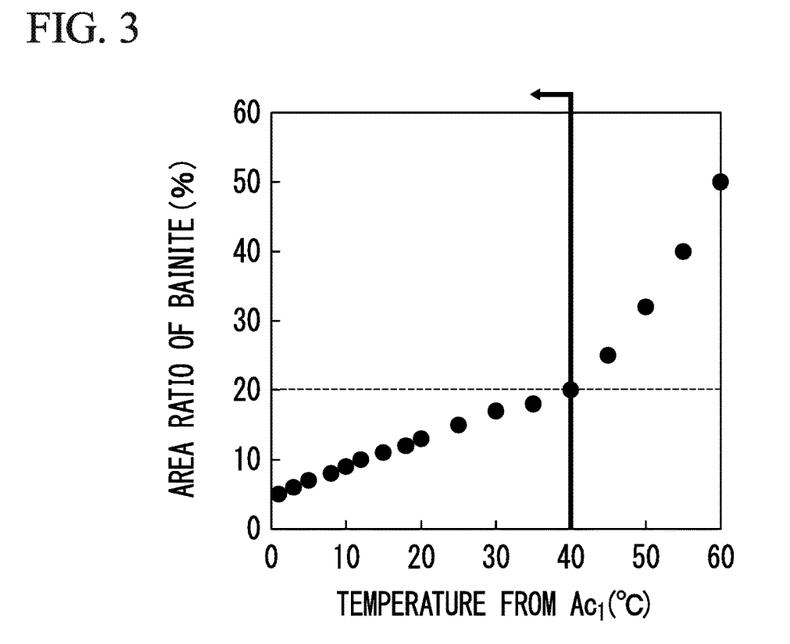
FIG. 3 is a graph showing a relationship between the maximum heating temperature, particularly, an $Ac_1$ transformation point or higher, in annealing and an area ratio of bainite.
Figure 4:
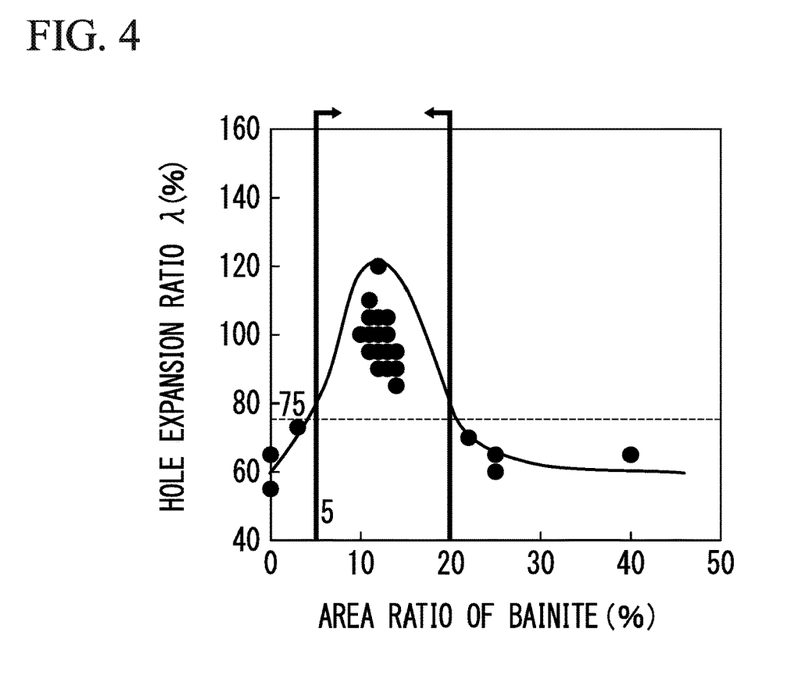
FIG. 4 is a graph showing a relationship between an area ratio of bainite and a hole expansion ratio λ.
Figure 5:
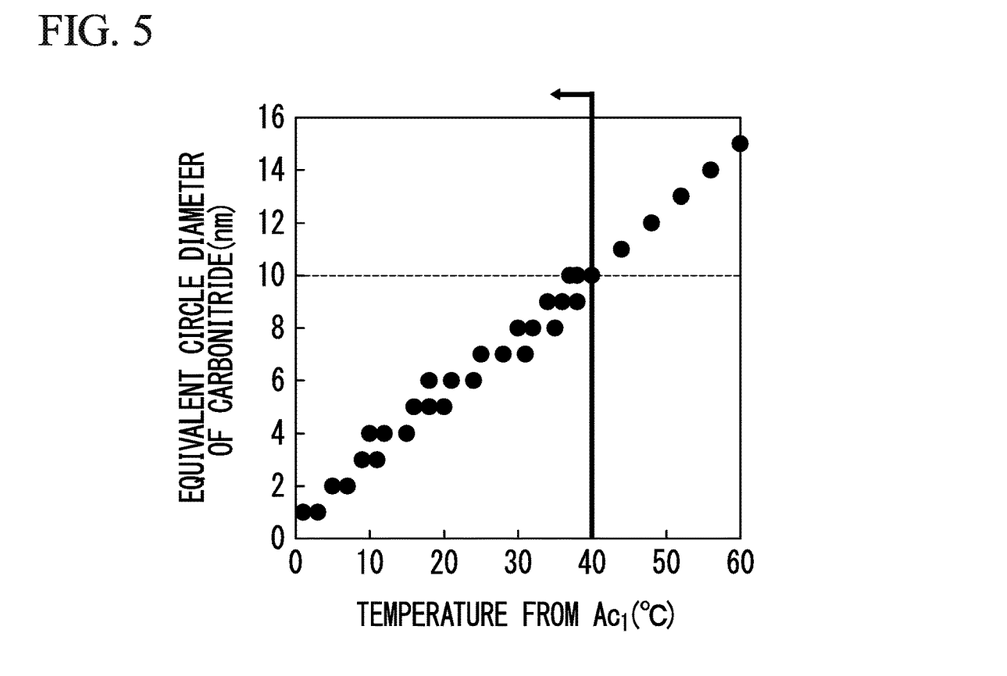
FIG. 5 is a graph showing a relationship between the maximum heating temperature, particularly, an $Ac_1$ transformation point or higher, in annealing and an equivalent circle diameter of carbonitrides.
Figure 6:
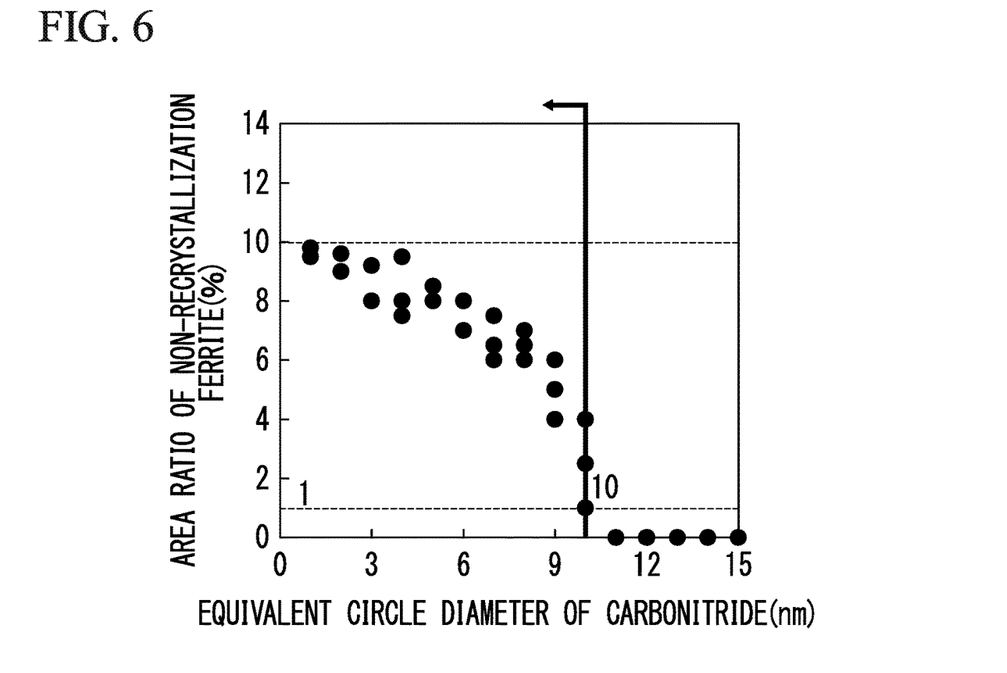
FIG. 6 is a graph showing a relationship between an equivalent circle diameter of carbonitrides and an area ratio of non-recrystallization ferrite.

The annealing is preferably carried out by the continuous annealing facility to control the heating temperature and the heating time. The maximum heating temperature in the annealing is an extremely important production condition in the present invention. The lower limit of the maximum heating temperature is set to an $Ac_1$ transformation temperature, and the upper limit is set to ($Ac_1$ transformation temperature+40)° C. When the maximum heating temperature is lower than the $Ac_1$ transformation temperature, a sufficient amount of a hard phase and non-recrystallization ferrite are not obtained, and a decrease in the tensile strength is caused. On the other hand, when the maximum heating temperature is higher than ($Ac_1$ transformation temperature+ 40)° C., the amount of the non-recrystallization ferrite is reduced as shown in FIG. 1, and thus, the stretch flangeability is decreased as shown in FIG. 2. The amount of bainite is increased as shown in FIG. 3, and thus, the stretch flangeability is decreased as shown in FIG. 4. Since the carbonitrides are coarsened as shown in FIG. 5, the amount of the non-recrystallization ferrite is reduced as shown in FIG. 6, and the stretch flangeability is decreased as shown in FIG. 2. Therefore, ($Ac_1$ transformation temperature+40)° C. is set as the upper limit.

Here, $Ac_1°$ C. is an $Ac_1$ transformation temperature obtained by the following Expression 2.

$$Ac_1=723+212\times[C]-10.7\times[Mn]+29.1\times[Si] \quad \text{(Expression 2)}$$

Wherein, elements noted in brackets represent an amount of the elements by mass %, respectively.

A temperature rising rate is set to 2° C./sec to 5° C./sec in the annealing. When the temperature rising rate is less than 2° C./sec, not only is the productivity deteriorated, but also recrystallization substantially proceeds to reduce the amount of non-recrystallization ferrite, and thus, the tensile strength and the stretch flangeability are decreased. Therefore, the lower limit is set to 2° C./sec. In addition, when the temperature rising rate is more than 5° C./sec, non-recrystallization ferrite remains excessively, and the ductility is decreased. Thus, the upper limit is set to 5° C./sec.

A holding time at the maximum heating temperature in the annealing is an extremely important production condition in the present invention. The holding time of the steel sheet within the temperature range of the $Ac_1$ transformation temperature to ($Ac_1$ transformation temperature+40)° C. is set to 10 seconds to 200 seconds. This is because when the holding time of the steel sheet at the maximum heating temperature is shorter than 10 seconds, non-recrystallization ferrite remains excessively, and thus, the ductility is decreased. On the other hand, when the holding time of the steel sheet at the maximum heating temperature is increased, a decreased in the productivity is caused and also the amount of non-recrystallization ferrite is reduced. Then, the tensile strength and the stretch flangeability are decreased, and thus, the upper limit is set to 200 seconds.

In addition, after the annealing, primary cooling for cooling the steel within a steel sheet temperature range of 600° C. to 720° C. tray be carried out under a cooling rate of 10° C./sec or less. Then, the steel sheet may be cooled and controlled to an appropriate temperature through forced cooling with spraying of a coolant, such as water, air blowing, or mist or the like, and over-aging or tempering is additionally carried out during the cooling as required. At a temperature of lower than 600° C., the fraction of bainite is insufficient and the ductility is decreased. At a temperature of higher than 720° C., the fraction of bainite is excessive, and the ductility is decreased. In addition, when the cooling rate is more than 10° C./sec, the precipitation of ferrite is small and the fraction of bainite becomes excessive, and thus, the ductility is decreased. The lower limit of the cooling rate is not particularly limited, but is preferably set to 1° C./sec or more in view of the productivity and the cooling controllability.

When hot dip galvanizing or galvannealing after the cooling after the annealing is carried out, the composition of zinc plating is not particularly limited, and in addition to Zn, Fe, Al, Mn, Cr, Mg, Pb, Sn, Ni, and the like may be added as required. The plating may be carried out as a separate process from annealing, but is preferably carried out through a continuous annealing-hot dip galvanizing line in which annealing, cooling and plating are continuously carried out in view of the productivity. When the following alloying treatment is not carried out, the steel sheet is cooled to a normal temperature after the plating.

When an alloying treatment is carried out, it is preferable that the alloying treatment be carried out within a temperature range of 450° C. to 600° C. after the plating, and then, the steel sheet be cooled to a normal temperature. This is because alloying does not sufficiently proceed at a temperature of lower than 450° C., and alloying excessively proceeds at a temperature of higher than 600° C. such that the plated layer is embrittled to cause a problem of exfoliation of the plating by working such as pressing or the like. When an alloying treatment time is shorter than 10 seconds, alloying does not sufficiently proceed, and thus, 10 seconds or longer is preferable. In addition, the upper limit of the alloying treatment time is not particularly limited, but preferably within 100 seconds in view of productivity.

In view of productivity, it is preferable that an alloying treatment furnace be provided continuously to the continuous annealing-hot dip galvanizing line to carry out annealing cooling, plating and an alloying treatment, and cooling in a continuous manner.

Examples of the plated layer shown in examples include hot dip galvanizing and galvannealing, and electrogalvanizing is also included.

Skin pass rolling is carried out to correct the shape and secure the surface properties, and is preferably carried out in a range of an elongation ratio of 0.2% to 2.0%. The reason why the lower limit of the elongation ratio of the skin pass rolling is set to 0.2% is that sufficient improvement in the surface roughness is not attained at an elongation ratio of less than 0.2%, and thus, the lower limit is set to 0.2%. On the other hand, when the skin pass rolling is carried out at the elongation ratio of more than 2.0%, the steel sheet is excessively work-hardened to deteriorate the press formability. Thus, the upper limit is set to 2.0%.

Next, a metallographic structure will be described.

The microstructure of the steel sheet obtained by the present invention is composed of mainly ferrite and bainite. When the area ratio of ferrite is less than 80%, bainite is increased and sufficient ductility cannot be obtained. Thus, the lower limit of the area ratio of ferrite is set to 80%. When the area ratio of ferrite is 95% or more, a tensile strength of 590 MPa or more cannot be secured in some cases, and thus, the upper limit of the area ratio of ferrite is set to less than 95%. Further, the area ratio of ferrite is preferably 90% or less.

Since the non-recrystallization ferrite contributes to hardening of the ferrite, the effect of improving the stretch flangeability is obtained by reducing the hardness difference with the bainite with appropriately controlling the area ratio of the non-recrystallization ferrite within a range of 1% or more and less than 10%. When the ratio of the non-recrystallization ferrite in the ferrite is less than 1%, the non-recrystallization ferrite does not contribute to hardening of the ferrite, and thus, the lower limit of the area ratio of the non-recrystallization ferrite is set to 1% or more. When the ratio of the non-recrystallization ferrite in the ferrite is 10% or more, a decrease in the hole expansion ratio or the like is caused, and thus, the upper limit is set to less than 10%.

Bainite contributes to high-strengthening. However, when the amount of bainite is excessive, a decrease in the ductility is caused, and thus, the lower limit is set to 5% and the upper limit is set to 20%.

Figure 7:
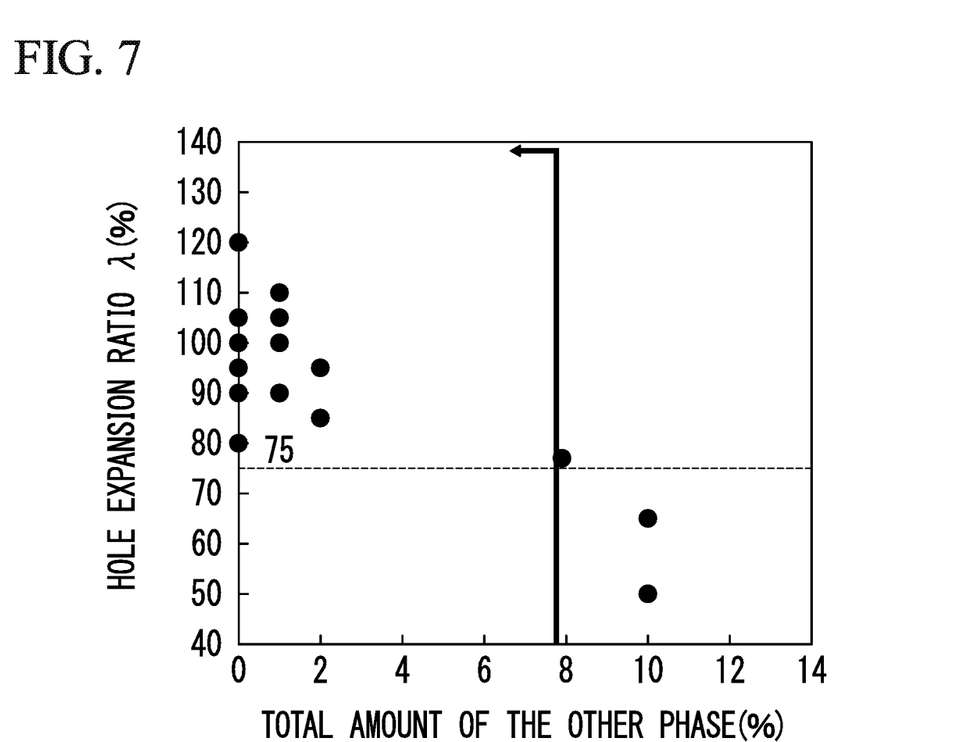
FIG. 7 is a graph showing a relationship between a total amount of other phase and a hole expansion ratio λ.

In addition, as shown in FIG. 7, as other phase, there are pearlite, residual austenite, and martensite. When a total amount (area ratio or volume ratio) of these components is 8% or more, the hardness difference with the ferrite is large, and thus, the hole expansion ratio or the like is decreased. Therefore, the upper limit of the total amount of the pearlite, residual austenite, and martensite is set to less than 8%. When the structure of the present invention can be obtained in the component range of the present invention, a tensile strength of 590 MPa or more can be obtained. The upper limit of the tensile strength is not particularly limited. However, considering the lower limit of the area ratio of the ferrite of the present invention, the upper limit may be set to about 780 MPa.

The equivalent circle diameter of the carbonitrides including one or both of Nb and Ti is set to 10 nm or less. As shown in FIG. 6, the average particle diameter of the carbonitrides is extremely important to appropriately control the amount of the non-recrystallization ferrite, and when the equivalent circle diameter is more than 10 nm, a sufficient recrystallization suppressing effect cannot be obtained and an appropriate amount of the non-recrystallization ferrite cannot be obtained. Thus, the upper limit is set to 10 nm. In addition, the lower limit is set to 1 nm or more in terms of accuracy in measurement.

The microstructure may be observed with an optical microscope by collecting a sample having an observation surface which is a cross section parallel to the rolling direction and the thickness direction, polishing the observation surface, and carrying out nital etching, and as required, Le Pera etching. In the observation of the microstructure, regarding the sample collected from an arbitrary position of the steel sheet, a portion which is at a ¼ portion along the thickness direction was imaged at a magnification of 1000 times in a range of 300×300 μm. The image of the microstructure obtained by the optical microscope is analyzed by binarizing the image to white and black so that a total area ratio of any one or two or more of pearlite, bainite, and martensite can be obtained as an area ratio of phases other than the ferrite. The fraction was measured for the sample collected from arbitrary position of the steel sheet with by the above method imaging a ¼ portion along the thickness direction at a magnification of 1000 times in a range of 300×300 μm and having 3 or more imaged view fields. It is difficult to distinguish residual austenite from martensite with the optical microscope, but the volume ratio of the residual austenite can be measured by an X-ray diffraction method. The sample used in the aforementioned microstructure observation is used for obtaining the fraction of the residual austenite. The non-recrystallization ferrite and ferrite other than the non-recrystallization ferrite can be determined by analyzing the measurement data of the orientation of an electron back scattering pattern (EBSP) by the Kernel Average Misorientation method (KAM method). In the grains of the non-recrystallization ferrite, dislocations are recovered, but a continuous change of the orientation, which is caused by plastic deformation during the cold rolling, is present. On the other hand, the change in the orientation in the grains of the ferrite other than the non-recrystallization ferrite becomes extremely small. In the KAM method, it is possible to quantitatively indicate the orientation difference with an adjacent measurement point. In the present invention, when an area between measurement points, the measurement points having 5° or more of average orientation difference, is defined as grain boundary, a grain in which the average orientation difference with an adjacent measurement point is 1° or less tend of which the grain size is more than 0.5 μm is defined as the ferrite other than the non-recrystallization ferrite. That is, the area ratio of the non-recrystallization ferrite is an area ratio obtained by subtracting the area ratio of ferrite other than the non-recrystallization ferrite from the area ratio of total ferrite. The area ratio obtained from the microstructure is the same as the volume ratio.

The average particle size of the carbonitrides including one or both of Nb and Ti is measured by preparing an extraction replica sample extracted from a portion which is at a depth of ¼ of the sheet thickness from a surface of arbitrary position of the steel sheet, and observing carbonitrides as a target with a transmission type electron microscope (TEM) to obtain the average particle size of the carbonitrides. The average particle size was obtained by imaging an image at a magnification of 10000 times in a range of 10×10 μm, and counting 100 random particles of alloy carbides. It is difficult to count a particle having a size of 1 nm, and 100 large particles are counted, not exactly in descending order, but in random order.

A test method of each mechanical property will be described below. A tensile test sample according to JIS Z 2201 No. 5 was taken from a steel sheet after being manufactured in which the width direction (referred to as the TD direction) is considered as the longitudinal direction, and the tensile properties in the TD direction were evaluated according to JIS Z 2241. The stretch flangeability was evaluated according to Japan Iron and Steel Federation Standard JFS T 1001. Each of the obtained steel sheets was cut to 100 mm×100 mm size pieces and then punched to have a hole with a diameter of 10 mm with a clearance being 12% of the thickness. Then, in a state in which blank holding pad were suppressed with a force of 88.2 kN and in which a die with an inner diameter of 75 mm is used, a 60° conical punch was forced through the hole to measure a hole diameter in a crack initiation limit. A limiting hole expansion ratio [%] was obtained from the following (Expression 3), and the stretch flangeability was evaluated based on the limiting hole expansion ratio.

Limiting hole expansion ratio $\lambda[\%]=\{(D_f-D_0)/D_0\}\times 100$ (Expression 3)

Here, $D_f$ represents a hole diameter [mm] at the time of crack initiation, and $D_0$ represents an initial hole diameter [mm]. In addition, plating adhesion is evaluated according to JIS H 0401 by visually observing a surface state of a plating film at a portion bent by a bending test.

EXAMPLES

Steel sheets were obtained by melting the steels having the compositions shown in Table 1, casting to obtain the slabs, and manufacturing the steel sheetsunder the conditions shown in Tables 2-1 and 2-2. "[–]" in Table 1 indicates that the analyzed value of a component is less than a detection limit. In addition, calculation values of $Ar_3$ [° C.] and $Ar_1$ [° C.] are also shown in Table 1.

A tensile test sample according to JIS Z 2201 No. 5 as taken from a steel sheet after being manufactured in which the width direction (referred to as the TD direction) is considered as the longitudinal direction, and the tensile properties in the TD direction were evaluated according to JIS Z 2241. In addition, the stretch flangeability was evaluated according to Japan Iron and Steel Federation Standard JFS T 1001. Each of the obtained steel sheets was cut to 100 mm×100 mm size pieces and then punched to have a hole with a diameter of 10 mm with a clearance being 12% of the thickness. Then, in a state in which blank holding pad were suppressed with a force of 88.2 kN and in which a die with an inner diameter of 75 mm is used, a 60° conical punch was forced through the hole to measure a hole diameter in a crack initiation limit. A limiting hole expansion ratio [%] was obtained from the following (Expression 3), and the stretch flangeability was evaluated based on the limiting hole expansion ratio.

Limiting hole expansion ratio $\lambda[\%]=\{(D_f-D_0)/D_0\}\times 100$ (Expression 3)

Here, $D_f$ represents a hole diameter [mm] at the time of crack initiation, and $D_0$ represents an initial hole diameter. In addition, plating adhesion is evaluated according to JIS H 0401 by visually observing a surface state of a plating film at a portion bent by a bending test.

The microstructure of the sheet thickness cross section of the steel sheet was observed by the above-described manner, and the area ratio of bainite was obtained as a total area ratio of phase which is not ferrite and other phases.

The result is shown in Tables 3-1 and 3-2. In the present invention, a sample having 17000 [MPa·%] or more of a product of tensile strength TS [MPa] and total elongation El [%], i.e. TS×El [MPa·%], which is a ductility index, is considered as acceptance. A sample having 75% or more of, and preferably 80% or more of the hole expansion ratio $\lambda[\%]$, which is a hole expansibility index, is considered as acceptance. In a case of a hot-dip galvanized steel sheet or a galvannealed steel sheet, plating adhesion is also set as a target. The plating adhesion was evaluated according to JIS H 0401 by visually observing a surface state of a plating film at a portion bent by a bending test.

As shown in Tables 3-1 and 3-2, it is possible to obtain a high-strength steel sheet, a hot-dip galvanized steel sheet, and a galvannealed steel sheet which have excellent ductility and stretch flangeability by subjecting steel having the chemical composition of the present invention to hot rolling, cold rolling, and annealing under appropriate conditions.

On the other hand, for Steel No. M, since the amount of C is large, the total elongation is decreased, the product of tensile strength and total elongation is decreased, and the hole expansion ratio is also decreased.

For Steel No. N, since the amount of C is small, the area ratio of bainite is reduced, the tensile strength is decreased, and the product of tensile strength and total elongation is decreased.

For Steel No. O, since the amount of Si is small, the hole expansion ratio is decreased.

For Steel No. P, since the amount of Si is large, the area ratio of bainite is reduced, the tensile strength and the total elongation are decreased, the product of tensile strength and total elongation is decreased, and the plating adhesion is also decreased.

For Steel No. Q, since the amount of Mn is small, the area ratio of bainite is reduced, the tensile strength and the total elongation are decreased, the product of tensile strength and total elongation is decreased, and the hole expansion ratio is also decreased.

For Steel No. R, since the amount of Mn is large, the area ratio of bainite is increased, the tensile strength is increased, the total elongation is decreased, the product of tensile strength and total elongation is decreased, and the hole expansion ratio is also decreased.

For Steel No. S, since the amount of Al is large, the area ratio of bainite is reduced, the tensile strength is decreased, the product of tensile strength and total elongation is decreased, and the hole expansion ratio is also decreased.

For Steel No. T, since the amount of N is large, the area ratio of bainite is increased, the total elongation is decreased, the product of tensile strength and total elongation is decreased, and the hole expansibility is also decreased.

For Steel No. U, since the amount of Ti and Nb is small, the area ratio of non-recrystallization ferrite is reduced, the tensile strength and the hole expansion ratio are decreased.

For Steel No. V, since the amount of Ti and Nb is large, the area ratio of non-recrystallization ferrite is increased, the total elongation is decreased, the product of tensile strength and total elongation is decreased, and the hole expansion ratio is also decreased.

For Steel No. W, since the amount of Nb is small, the area ratio of non-recrystallization ferrite is reduced, the tensile strength and the hole expansion ratio are decreased.

For Steel No. X, since the amount of Ti is large, the area ratio of non-recrystallization ferrite is increased, the total elongation is decreased and the product of the tensile strength and the total elongation is decreased. Also, the hole expansion ratio is decreased.

For Steel No. Y, since the amount of Nb is large, the area ratio of non-recrystallization ferrite is increased, the total elongation is decreased, the product of tensile strength and total elongation is decreased, and the hole expansion ratio is also decreased.

For Production No. 3, since the heating temperature during the hot rolling is low, the carbonitrides are coarsened and the recrystallization suppressing effect during the annealing is small, and thus, the area ratio of the non-recrystallization ferrite is reduced and the tensile strength and the hole expansion ratio are decreased.

For Production No. 6, since the finishing temperature during the hot rolling is slightly low, the carbonitrides are coarsened and the recrystallization suppressing effect during the annealing is small, and thus, the area ratio of non-recrystallization ferrite is reduced and the tensile strength and the hole expansion ratio are decreased.

For Production No. 9, since the finishing temperature during the hot rolling is slightly low, the carbonitrides are coarsened and the recrystallization suppressing effect during the annealing is small, and thus, the area ratio of non-recrystallization ferrite is reduced and the tensile strength and the hole expansion ratio are decreased.

For Production No. 12, since the finishing temperature during the hot rolling is low, carbonitrides are coarsened and the recrystallization suppressing effect during the annealing is small, and thus, the area ratio of non-recrystallization ferrite is reduced and the tensile strength and the hole expansion ratio are decreased.

For Production No. 15, since the coiling temperature is high, the carbonitrides are coarsened and the recrystallization suppressing effect during the annealing is small, and thus, the area ratio of non-recrystallization ferrite is reduced and the tensile strength and the hole expansion ratio are decreased.

For Production No. 18, since the cold rolling reduction is low, the area ratio of non-recrystallization ferrite is increased and the total elongation is decreased, and thus, the product of tensile strength and total elongation is decreased, and the hole expansion ratio is also decreased.

For Production No. 21, since the maximum heating temperature is high during the annealing, the carbonitrides are coarsened, and the recrystallization suppressing effect during the annealing is small, the area ratio of non-recrystallization ferrite is reduced. The area ratio of bainite is increased, and thus, the hole expansion ratio is decreased.

For Production No. 24, since the maximum heating temperature during the annealing is low, the area ratio of bainite is reduced, and thus, the tensile strength and the total elongation are decreased, and the product of tensile strength and total elongation is decreased. Also, the hole expansion ratio is decreased.

For Production No. 25, since the end temperature of primary cooling after annealing is excessively high, the area ratio of ferrite does not reach a predetermined value, and relatively, the area ratio of bainite is increased. The hole expansion ratio is decreased.

For Production No. 28, the holding time at the maximum heating temperature during the annealing is short, the amount of bainite is reduced and the area ratio of non-recrystallization ferrite is increased. Thus, the total elongation is decreased, the product of tensile strength and total elongation is decreased and the hole expansion ratio is also decreased.

For Production No. 29, since the end temperature of primary cooling after annealing is excessively low, the area ratio of ferrite is increased excessively, and relatively, the area ratio of bainite is reduced excessively. While the hole expansion ratio is satisfied, the tensile strength does not reach a predetermined value, and also the balance between tensile strength and total elongation is poor. The product of tensile strength and total elongation is also decreased.

For Production No. 32, since the holding time at the maximum heating temperature during the annealing is long, the carbonitrides are coarsened and the recrystallization suppressing effect during the annealing is small, and thus, the area ratio of non-recrystallization ferrite is reduced and the area ratio of bainite is increased. Thus, the hole expansion ratio is decreased.

For Production No. 33 since the annealing primary cooling rate is excessively high, the area ratio of ferrite does not reach a predetermined value and relatively, the area ratio of bainite is increased. Thus, the hole expansion ratio is decreased and also the balance between tensile strength and total elongation is poor. The product of tensile strength and total elongation is also decreased.

For Production No. 34, since the coiling temperature is low and the recrystallization suppressing effect by carbonitrides during the annealing is large, the area ratio of non-recrystallization ferrite is increased and the total elongation is decreased. The product of tensile strength and total elongation is decreased and the hole expansion ratio is also decreased.

For Production No. 39, since the temperature rising rate during the annealing is high, the area ratio of non-recrystallization is increased and the total elongation is decreased. The product of tensile strength and total elongation is decreased and the hole expansion ratio is also decreased.

[Table 1]
[Table 2-1]
[Table 2-2]
[Table 3-1]
[Table 3-2]

INDUSTRIAL APPLICABILITY

According to the present invention, it is possible to provide a high-strength cold-rolled steel sheet and a plated steel sheet which have a tensile strength of 590 MPa or more, and excellent ductility and stretch flangeability, and the present invention makes an extremely significant contribution to the industry.

TABLE 1

| STEEL No | C % | Si % | Mn % | P % | S % | Al % | N % | Ti % | Nb % | Ti + Nb % | Mo % |
|---|---|---|---|---|---|---|---|---|---|---|---|
| A | 0.045 | 0.45 | 2.10 | 0.0071 | 0.0025 | 0.030 | 0.0033 | — | 0.015 | 0.015 | — |
| B | 0.050 | 0.30 | 2.00 | 0.0068 | 0.0028 | 0.033 | 0.0034 | 0.020 | — | 0.020 | — |
| C | 0.055 | 0.25 | 1.95 | 0.0070 | 0.0027 | 0.032 | 0.0033 | — | 0.025 | 0.025 | — |
| D | 0 035 | 0.70 | 1.90 | 0.0069 | 0.0026 | 0.025 | 0.0039 | — | 0.020 | 0.020 | — |

TABLE 1-continued

| Steel | | | | | | | | | | | |
|---|---|---|---|---|---|---|---|---|---|---|---|
| E | 0.050 | 0.30 | 2.00 | 0.0067 | 0.0025 | 0.027 | 0.0035 | 0.010 | 0.010 | 0.020 | 0.15 |
| F | 0.055 | 0.40 | 1.85 | 0.0073 | 0.0030 | 0.028 | 0.0040 | 0.025 | — | 0.025 | — |
| G | 0.070 | 0.25 | 1.50 | 0.0070 | 0.0029 | 0.033 | 0.0035 | 0.015 | 0.010 | 0.025 | — |
| H | 0.060 | 0.35 | 1.95 | 0.0071 | 0.0028 | 0.039 | 0.0036 | — | 0.010 | 0.010 | 0.10 |
| I | 0.040 | 0.50 | 2.05 | 0.0065 | 0.0024 | 0.035 | 0.0041 | 0.010 | 0.015 | 0.025 | — |
| J | 0.030 | 0.65 | 1.80 | 0.0073 | 0.0023 | 0.031 | 0.0039 | — | 0.010 | 0.010 | 0.15 |
| K | 0.065 | 0.55 | 1.40 | 0.0069 | 0.0024 | 0.035 | 0.0033 | 0.020 | — | 0.020 | 0.10 |
| L | 0.075 | 0.80 | 1.20 | 0.0081 | 0.0030 | 0.029 | 0.0034 | — | 0.025 | 0.025 | — |
| M | 0.150 | 0.30 | 2.00 | 0.0079 | 0.0027 | 0.034 | 0.0033 | — | 0.015 | 0.015 | — |
| N | 0.010 | 0.35 | 1.70 | 0.0068 | 0.0033 | 0.037 | 0.0031 | 0.010 | 0.010 | 0.020 | — |
| O | 0.050 | 0.05 | 1.80 | 0.0077 | 0.0025 | 0.036 | 0.0038 | 0.020 | — | 0.020 | — |
| P | 0.040 | 1.50 | 2.10 | 0.0070 | 0.0032 | 0.029 | 0.0032 | — | 0.010 | 0.010 | — |
| Q | 0.045 | 0.45 | 0.50 | 0.0088 | 0.0025 | 0.030 | 0.0037 | — | 0.020 | 0.020 | 0.15 |
| R | 0.055 | 0.30 | 3.00 | 0.0071 | 0.0028 | 0.031 | 0.0033 | 0.015 | — | 0.015 | — |
| S | 0.035 | 0.40 | 2.20 | 0.0073 | 0.0031 | 0.120 | 0.0034 | 0.015 | 0.010 | 0.025 | — |
| T | 0.050 | 0.45 | 1.90 | 0.0081 | 0.0030 | 0.032 | 0.0140 | 0.010 | 0.015 | 0.025 | — |
| U | 0.050 | 0.35 | 1.95 | 0.0085 | 0.0026 | 0.034 | 0.0029 | 0.002 | — | 0.002 | — |
| V | 0.045 | 0.50 | 2.00 | 0.0075 | 0.0028 | 0.040 | 0.0040 | 0.010 | 0.025 | 0.035 | — |
| W | 0.045 | 0.40 | 1.90 | 0.0078 | 0.0032 | 0.033 | 0.0041 | — | 0.002 | 0.002 | — |
| X | 0.055 | 0.45 | 2.00 | 0.0080 | 0.0029 | 0.031 | 0.0035 | 0.035 | — | 0.035 | — |
| Y | 0.050 | 0.50 | 1.85 | 0.0068 | 0.0031 | 0.038 | 0.0036 | — | 0.035 | 0.035 | — |

| STEEL No | W % | V % | B % | Ni % | Cu % | Cr % | $Ar_3$ °C. | $Ac_1$ °C. | REMARKS |
|---|---|---|---|---|---|---|---|---|---|
| A | — | — | — | — | — | — | 720 | 723 | INVENTION STEEL |
| B | — | — | — | — | — | — | 723 | 721 | INVENTION STEEL |
| C | — | — | — | — | — | — | 724 | 721 | INVENTION STEEL |
| D | — | — | — | 0.30 | — | — | 736 | 730 | INVENTION STEEL |
| E | — | — | — | — | — | 0.15 | 702 | 721 | INVENTION STEEL |
| F | 0.20 | 0.20 | — | — | — | — | 738 | 727 | INVENTION STEEL |
| G | — | — | 0.0010 | — | 0.50 | — | 715 | 729 | INVENTION STEEL |
| H | — | — | — | — | — | — | 717 | 725 | INVENTION STEEL |
| I | 0.10 | — | 0.0010 | 0.15 | — | — | 721 | 724 | INVENTION STEEL |
| J | — | 0.30 | — | — | 0.30 | — | 718 | 729 | INVENTION STEEL |
| K | 0.20 | — | — | 0.30 | — | 0.30 | 745 | 738 | INVENTION STEEL |
| L | — | — | 0.0015 | — | 0.50 | 0.50 | 736 | 749 | INVENTION STEEL |
| M | — | — | — | — | — | — | 691 | 742 | COMPARATIVE STEEL |
| N | — | — | — | — | — | — | 765 | 717 | COMPARATIVE STEEL |
| O | — | — | 0.0015 | — | — | — | 733 | 716 | COMPARATIVE STEEL |
| P | — | — | — | — | — | — | 756 | 753 | COMPARATIVE STEEL |
| Q | — | — | — | — | — | — | 854 | 740 | COMPARATIVE STEEL |
| R | — | — | — | — | — | — | 629 | 711 | COMPARATIVE STEEL |
| S | — | — | — | — | — | — | 716 | 719 | COMPARATIVE STEEL |
| T | — | — | — | — | — | — | 737 | 726 | COMPARATIVE STEEL |

TABLE 1-continued

| | | | | | | | | | |
|---|---|---|---|---|---|---|---|---|---|
| | U | — | — | — | — | — | — | 730 | 723 | COMPARATIVE STEEL |
| | V | — | — | — | — | — | 0.15 | 725 | 726 | COMPARATIVE STEEL |
| | W | — | — | — | — | — | — | 737 | 724 | COMPARATIVE STEEL |
| | X | — | — | — | — | — | — | 727 | 726 | COMPARATIVE STEEL |
| | Y | — | — | — | — | — | — | 744 | 728 | COMPARATIVE STEEL |

(ANNOTATION 1) THE UNDERLINED VALUES ARE OUT OF THE RANGE OF THE PRESENT INVENTION

TABLE 2-1

| STEEL No. | MANUFAC- TURING No. | HOT ROLLING | | | COLD ROLLING RE- DUCTION % | ANNEALING | |
|---|---|---|---|---|---|---|---|
| | | HEATING TEM- PERATURE ° C. | FINISHING TEM- PERATURE ° C. | COILING TEM- PERATURE ° C. | | TEMPERATURE RISING RATE ° C./sec | MAXIMUM HEATING TEMPERATURE ° C. |
| A | 1 | 1220 | 930 | 580 | 60 | 3 | 750 |
|   | 2 | 1200 | 910 | 550 | 60 | 3 | 755 |
|   | 3 | 1060 | 920 | 540 | 60 | 2 | 750 |
| B | 4 | 1200 | 920 | 550 | 65 | 3 | 755 |
|   | 5 | 1220 | 920 | 560 | 65 | 3 | 755 |
|   | 6 | 1220 | 900 | 550 | 85 | 4 | 760 |
| C | 7 | 1200 | 940 | 480 | 60 | 3 | 760 |
|   | 8 | 1200 | 930 | 520 | 60 | 3 | 760 |
|   | 9 | 1210 | 900 | 580 | 65 | 1 | 755 |
| D | 10 | 1230 | 900 | 550 | 55 | 3 | 760 |
|   | 11 | 1250 | 940 | 500 | 60 | 3 | 750 |
|   | 12 | 1210 | 720 | 590 | 60 | 3 | 760 |
| E | 13 | 1180 | 920 | 570 | 65 | 4 | 755 |
|   | 14 | 1200 | 930 | 550 | 60 | 3 | 750 |
|   | 15 | 1220 | 920 | 700 | 65 | 3 | 750 |
| F | 16 | 1220 | 880 | 450 | 55 | 3 | 765 |
|   | 17 | 1190 | 900 | 550 | 60 | 3 | 760 |
|   | 18 | 1200 | 920 | 300 | 25 | 3 | 755 |
| G | 19 | 1240 | 920 | 590 | 60 | 2 | 745 |
|   | 20 | 1220 | 910 | 580 | 60 | 3 | 755 |
|   | 21 | 1200 | 900 | 590 | 65 | 3 | 820 |
| H | 22 | 1220 | 900 | 450 | 55 | 3 | 760 |
|   | 23 | 1250 | 900 | 500 | 60 | 4 | 750 |
|   | 24 | 1200 | 910 | 550 | 60 | 3 | 600 |
|   | 25 | 1210 | 900 | 550 | 55 | 4 | 750 |

| STEEL No. | ANNEALING | | | | | SKIN PASS ROLLING |
|---|---|---|---|---|---|---|
| | HOLDING TIME sec | END TEMPERATURE OF PRIMARY COOLING ° C. | COOLING RATE OF PRIMARY COOLING ° C./sec | ALLOYING TREATMENT TEMPERATURE ° C. | ALLOYING TREATMENT TIME sec | AFTER ANNEALING ELONGATION RATIO % |
| A | 100 | 620 | 3 | 540 | 25 | 0.4 |
|   | 80 | 680 | 5 | — | — | 0.6 |
|   | 120 | 650 | 4 | 550 | 30 | 0.4 |
| B | 100 | 630 | 3 | 550 | 30 | 0.6 |
|   | 120 | 700 | 3 | 540 | 30 | 0.6 |
|   | 100 | 650 | 6 | 550 | 20 | 0.6 |
| C | 80 | 640 | 5 | 550 | 25 | 0.6 |
|   | 100 | 690 | 4 | 550 | 30 | 0.4 |
|   | 120 | 620 | 5 | 540 | 30 | 0.6 |
| D | 80 | 650 | 5 | — | — | 0.6 |
|   | 100 | 630 | 5 | 550 | 30 | 0.8 |
|   | 100 | 670 | 5 | 550 | 25 | 0.8 |

TABLE 2-1-continued

| STEEL No. | HOLDING TIME sec | END TEMPERATURE OF PRIMARY COOLING °C | COOLING RATE OF PRIMARY COOLING °C/sec | ALLOYING TREATMENT TEMPERATURE °C | ALLOYING TREATMENT TIME sec | SKIN PASS ROLLING AFTER ANNEALING ELONGATION RATIO % |
|---|---|---|---|---|---|---|
| E | 100 | 710 | 3 | — | — | 0.6 |
|   | 100 | 660 | 2 | 520 | 30 | 0.6 |
|   | 120 | 650 | 3 | 540 | 30 | 0.8 |
| F | 80 | 650 | 2 | 550 | 20 | 0.7 |
|   | 100 | 680 | 2 | — | — | 0.4 |
|   | 80 | 670 | 3 | 530 | 35 | 0.5 |
| G | 100 | 640 | 5 | 550 | 30 | 0.5 |
|   | 100 | 630 | 4 | 560 | 30 | 0.8 |
|   | 120 | 610 | 4 | 550 | 35 | 0.8 |
| H | 100 | 700 | 3 | — | — | 0.8 |
|   | 80 | 680 | 5 | — | — | 0.8 |
|   | 100 | 680 | 3 | 570 | 20 | 0.6 |
|   | 90 | 750 | 3 | 540 | 25 | 0.4 |

(ANNOTATION 1) THE UNDERLINED VALUES ARE OUT OF THE RANGE OF THE PRESENT INVENTION

TABLE 2-2

| STEEL No. | MANUFAC-TURING No. | HOT ROLLING HEATING TEMPERATURE °C | HOT ROLLING FINISHING TEMPERATURE °C | HOT ROLLING COILING TEMPERATURE °C | COLD ROLLING REDUCTION % | ANNEALING TEMPERATURE RISING RATE °C/sec | ANNEALING MAXIMUM HEATING TEMPERATURE °C |
|---|---|---|---|---|---|---|---|
| I | 26 | 1200 | 920 | 550 | 60 | 4 | 755 |
|   | 27 | 1190 | 920 | 550 | 65 | 3 | 755 |
|   | 28 | 1220 | 900 | 550 | 55 | 3 | 750 |
|   | 29 | 1210 | 910 | 540 | 60 | 3 | 760 |
| J | 30 | 1220 | 900 | 480 | 60 | 3 | 765 |
|   | 31 | 1230 | 920 | 590 | 65 | 2 | 760 |
|   | 32 | 1220 | 900 | 520 | 50 | 3 | 755 |
|   | 33 | 1200 | 900 | 530 | 60 | 3 | 760 |
| K | 34 | 1220 | 900 | <u>400</u> | 55 | 2 | 770 |
|   | 35 | 1210 | <u>390</u> | 550 | 60 | 2 | 770 |
|   | 36 | 1220 | 900 | 530 | 60 | 3 | 760 |
| L | 37 | 1210 | 920 | 550 | 65 | 3 | 770 |
|   | 38 | 1220 | 910 | 600 | 60 | 3 | 780 |
|   | 39 | 1240 | 900 | 450 | 65 | <u>10</u> | 765 |
| M | 40 | 1220 | 920 | 550 | 60 | 3 | 770 |
| N | 41 | 1200 | 900 | 550 | 55 | 3 | 750 |
| O | 42 | 1200 | 930 | 600 | 60 | 3 | 750 |
| P | 43 | 1220 | 900 | 580 | 65 | 3 | 770 |
| Q | 44 | 1230 | 900 | 450 | 60 | 3 | 770 |
| R | 45 | 1220 | 920 | 530 | 55 | 3 | 750 |
| S | 46 | 1220 | 900 | 550 | 65 | 3 | 750 |
| T | 47 | 1200 | 900 | 550 | 60 | 3 | 760 |
| U | 48 | 1190 | 900 | 530 | 60 | 3 | 760 |
| V | 49 | 1180 | 920 | 570 | 60 | 3 | 760 |
| W | 50 | 1200 | 920 | 580 | 60 | 3 | 760 |
| X | 51 | 1220 | 900 | 530 | 65 | 3 | 760 |
| Y | 52 | 1200 | 900 | 550 | 60 | 3 | 760 |

| STEEL No. | ANNEALING HOLDING TIME sec | ANNEALING END TEMPERATURE OF PRIMARY COOLING °C | ANNEALING COOLING RATE OF PRIMARY COOLING °C/sec | ANNEALING ALLOYING TREATMENT TEMPERATURE °C | ANNEALING ALLOYING TREATMENT TIME sec | SKIN PASS ROLLING AFTER ANNEALING ELONGATION RATIO % |
|---|---|---|---|---|---|---|
| I | 100 | 660 | 3 | 530 | 30 | 0.6 |
|   | 120 | 640 | 2 | — | — | 0.6 |
|   | <u>2</u> | 670 | 3 | 550 | 30 | 0.4 |
|   | 120 | <u>570</u> | 7 | 540 | 30 | 0.6 |
| J | 100 | 650 | 8 | — | — | 0.8 |
|   | 100 | 700 | 5 | 540 | 25 | 0.8 |
|   | <u>400</u> | 710 | 4 | 530 | 35 | 0.6 |
|   | 80 | 670 | <u>15</u> | 550 | 30 | 0.6 |

TABLE 2-2-continued

| | | | | | | |
|---|---|---|---|---|---|---|
| K | 100 | 630 | 3 | — | — | 0.6 |
| | 80 | 620 | 2 | 540 | 30 | 0.6 |
| | 100 | 630 | 3 | 550 | 30 | 0.4 |
| L | 120 | 630 | 3 | 520 | 35 | 0.4 |
| | 120 | 650 | 3 | — | — | 0.6 |
| | 100 | 630 | 2 | 550 | 20 | 0.4 |
| M | 120 | 690 | 4 | 550 | 30 | 0.4 |
| N | 100 | 700 | 5 | 540 | 25 | 0.6 |
| O | 80 | 680 | 5 | 550 | 30 | 0.8 |
| P | 100 | 670 | 4 | 540 | 30 | 0.6 |
| Q | 100 | 630 | 4 | — | — | 0.4 |
| R | 120 | 640 | 4 | 550 | 30 | 0.6 |
| S | 80 | 650 | 5 | 540 | 30 | 0.6 |
| T | 120 | 650 | 3 | 540 | 30 | 0.8 |
| U | 100 | 650 | 2 | 550 | 30 | 0.6 |
| V | 120 | 660 | 4 | 550 | 25 | 0.6 |
| W | 80 | 630 | 3 | — | — | 0.6 |
| X | 120 | 620 | 5 | 540 | 30 | 0.8 |
| Y | 100 | 680 | 2 | 530 | 35 | 0.6 |

(ANNOTATION 1) THE UNDERLINED VALUES ARE OUT OF THE RANGE OF THE PRESENT INVENTION

TABLE 3-1

| | | MICROSTRUCTURE | | | | CARBONITRIDE | MECHANICAL PROPERTIES |
|---|---|---|---|---|---|---|---|
| STEEL No. | MANUFAC- TURING No. | AREA RATIO OF FERRITE % | AREA RATIO OF NON- RECRYSTALLIZATION FERRITE % | AREA RATIO OF BAINITE % | TOTAL AMOUNT OF THE OTHER PHASE % | EQUIVALENT CIRCLE DIAMETER nm | YIELD STRENGTH YP MPa |
| A | 1 | 89 | 7 | 11 | 0 | 7 | 440 |
| | 2 | 87 | 6 | 13 | 0 | 8 | 450 |
| | 3 | 88 | 0 | 12 | 0 | 30 | 400 |
| B | 4 | 88 | 8 | 11 | 1 | 6 | 445 |
| | 5 | 87 | 7 | 13 | 0 | 7 | 455 |
| | 6 | 87 | 0 | 13 | 0 | 25 | 405 |
| C | 7 | 89 | 9 | 10 | 1 | 5 | 450 |
| | 8 | 88 | 8 | 11 | 1 | 6 | 460 |
| | 9 | 88 | 0 | 12 | 0 | 35 | 400 |
| D | 10 | 88 | 9 | 12 | 0 | 5 | 445 |
| | 11 | 89 | 9 | 11 | 0 | 5 | 445 |
| | 12 | 86 | 0 | 14 | 0 | 25 | 405 |
| E | 13 | 88 | 7 | 12 | 0 | 7 | 420 |
| | 14 | 89 | 8 | 11 | 0 | 6 | 420 |
| | 15 | 88 | 0 | 11 | 1 | 15 | 410 |
| F | 16 | 87 | 7 | 13 | 0 | 7 | 470 |
| | 17 | 88 | 8 | 12 | 0 | 6 | 470 |
| | 18 | 88 | 20 | 12 | 0 | 4 | 510 |
| G | 19 | 86 | 9 | 12 | 2 | 4 | 480 |
| | 20 | 90 | 8 | 10 | 0 | 6 | 440 |
| | 21 | 75 | 2 | 15 | 10 | 25 | 390 |
| H | 22 | 88 | 5 | 10 | 2 | 9 | 440 |
| | 23 | 87 | 6 | 12 | 1 | 8 | 440 |
| | 24 | 100 | 50 | 0 | 0 | 5 | 480 |
| | 25 | 72 | 5 | 25 | 3 | 5 | 380 |

| | | MECHANICAL PROPERTIES | | | | |
|---|---|---|---|---|---|---|
| STEEL No. | | TENSILE STRENGTH TS MPa | TOTAL ELONGATION El % | TS × El MPa · % | HOLE EXPANSION RATIO λ % | PLATING ADHESION |
| A | | 610 | 29 | 17690 | 100 | GOOD |
| | | 630 | 28 | 17640 | 90 | GOOD |
| | | 580 | 30 | 17400 | 70 | GOOD |

TABLE 3-1-continued

| Steel | | | | | |
|---|---|---|---|---|---|
| B | 620 | 28 | 17360 | 105 | GOOD |
|   | 635 | 28 | 17780 | 95  | GOOD |
|   | 580 | 30 | 17400 | 70  | GOOD |
| C | 620 | 28 | 17360 | 110 | GOOD |
|   | 635 | 28 | 17780 | 100 | GOOD |
|   | 580 | 30 | 17400 | 70  | GOOD |
| D | 625 | 28 | 17500 | 90  | — |
|   | 620 | 28 | 17360 | 95  | GOOD |
|   | 585 | 30 | 17550 | 70  | GOOD |
| E | 615 | 29 | 17835 | 105 | GOOD |
|   | 615 | 29 | 17835 | 105 | GOOD |
|   | 580 | 30 | 17400 | 70  | GOOD |
| F | 630 | 28 | 17640 | 95  | GOOD |
|   | 630 | 28 | 17640 | 95  | — |
|   | 660 | 24 | 15840 | 65  | GOOD |
| G | 640 | 27 | 17280 | 85  | GOOD |
|   | 615 | 29 | 17835 | 100 | GOOD |
|   | 710 | 24 | 17040 | 50  | GOOD |
| H | 630 | 28 | 17640 | 95  | — |
|   | 625 | 28 | 17500 | 100 | — |
|   | 560 | 26 | 14560 | 55  | GOOD |
|   | 700 | 25 | 17500 | 65  | GOOD |

(ANNOTATION 1) THE UNDERLINED VALUES ARE OUT OF THE RANGE OF THE PRESENT INVENTION

TABLE 3-2

| | | MICROSTRUCTURE | | | | CARBONITRIDE | MECHANICAL PROPERTIES |
|---|---|---|---|---|---|---|---|
| STEEL No. | MANUFAC-TURING No | AREA RATIO OF FERRITE % | AREA RATIO OF NON-RECRYSTALLIZATION FERRITE % | AREA RATIO OF BAINITE % | TOTAL AMOUNT OF THE OTHER PHASE % | EQUIVALENT CIRCLE DIAMETER nm | YIELD STRENGTH YP MPa |
| I | 26 | 88 | 9  | 12 | 0  | 4  | 445 |
|   | 27 | 87 | 9  | 12 | 1  | 5  | 445 |
|   | 28 | 97 | 15 | 3  | 0  | 3  | 520 |
|   | 29 | 98 | 5  | 2  | 0  | 4  | 340 |
| J | 30 | 87 | 6  | 12 | 1  | 8  | 440 |
|   | 31 | 88 | 7  | 12 | 0  | 7  | 440 |
|   | 32 | 75 | 0  | 22 | 3  | 25 | 400 |
|   | 33 | 73 | 5  | 24 | 3  | 5  | 500 |
| K | 34 | 86 | 15 | 13 | 1  | 2  | 510 |
|   | 35 | 87 | 8  | 13 | 0  | 6  | 445 |
|   | 36 | 87 | 9  | 13 | 0  | 5  | 460 |
| L | 37 | 88 | 8  | 12 | 0  | 6  | 450 |
|   | 38 | 86 | 7  | 13 | 1  | 7  | 450 |
|   | 39 | 89 | 30 | 11 | 0  | 2  | 580 |
| M | 40 | 88 | 8  | 12 | 0  | 6  | 520 |
| N | 41 | 100| 8  | 0  | 0  | 6  | 360 |
| O | 42 | 90 | 9  | 10 | 0  | 4  | 460 |
| P | 43 | 97 | 4  | 3  | 0  | 10 | 500 |
| Q | 44 | 98 | 9  | 2  | 0  | 4  | 500 |
| R | 45 | 60 | 7  | 30 | 10 | 7  | 500 |
| S | 46 | 97 | 8  | 3  | 0  | 6  | 500 |
| T | 47 | 70 | 8  | 25 | 5  | 6  | 480 |
| U | 48 | 87 | 0  | 12 | 1  | 8  | 360 |
| V | 49 | 87 | 25 | 13 | 0  | 7  | 515 |

TABLE 3-2-continued

| Steel | | | | | | | |
|---|---|---|---|---|---|---|---|
| W | 50 | 88 | <u>0</u> | 12 | 0 | 8 | 360 |
| X | 51 | 87 | <u>20</u> | 13 | 0 | 7 | 500 |
| Y | 52 | 87 | <u>25</u> | 12 | 1 | 7 | 515 |

| | MECHANICAL PROPERTIES | | | | |
|---|---|---|---|---|---|
| STEEL No | TENSILE STRENGTH TS MPa | TOTAL ELONGATION El % | TS × El MPa · % | HOLE EXPANSION RATIO λ % | PLATING ADHESION |
| I | 625 | 28 | 17500 | 105 | GOOD |
| | 625 | 28 | 17500 | 100 | GOOD |
| | 605 | 26 | 15730 | 70 | GOOD |
| | <u>550</u> | 30 | 16500 | 80 | GOOD |
| J | 615 | 29 | 17835 | 105 | — |
| | 615 | 29 | 17835 | 105 | GOOD |
| | 680 | 26 | 17680 | 60 | GOOD |
| | 720 | 23 | 16560 | 60 | GOOD |
| K | 640 | 25 | 16000 | 70 | GOOD |
| | 625 | 28 | 17500 | 90 | GOOD |
| | 630 | 28 | 17640 | 90 | GOOD |
| L | 620 | 28 | 17360 | 100 | GOOD |
| | 630 | 28 | 17640 | 90 | — |
| | 655 | 24 | 15720 | 60 | GOOD |
| M | 720 | 22 | 15840 | 50 | GOOD |
| N | 550 | 30 | 16500 | 95 | GOOD |
| O | 620 | 28 | 17360 | 60 | GOOD |
| P | 580 | 28 | 16240 | 120 | BAD |
| Q | <u>585</u> | 28 | 16380 | 70 | — |
| R | 720 | 22 | 15840 | 65 | GOOD |
| S | <u>580</u> | 28 | 16240 | 70 | GOOD |
| T | 680 | 23 | 15640 | 65 | GOOD |
| U | <u>585</u> | 30 | 17550 | 65 | GOOD |
| V | 640 | 25 | 16000 | 60 | GOOD |
| W | 585 | 30 | 17550 | 65 | — |
| X | 630 | 25 | 15750 | 60 | GOOD |
| Y | 640 | 25 | 16000 | 60 | GOOD |

(ANNOTATION 1) THE UNDERLINED VALUES ARE OUT OF THE RANGE OF THE PRESENT INVENTION

The invention claimed is:

1. A method for manufacturing a cold-rolled steel sheet, the cold-rolled steel sheet consisting of, by mass %:
C: 0.020% or more and 0.080% or less;
Si: 0.20% or more and 1.00% or less;
Mn: 0.80% or more and 2.30% or less;
P: 0.0050% or more and 0.1500% or less;
S: 0.0020% or more and 0.0150% or less;
Al: 0.010% or more and 0.100% or less;
N: 0.0010% or more and 0.0100% or less;
one or more of Nb and Ti which satisfy a requirement of 0.005%≤Nb+Ti<0.030%; and
a remainder including Fe and unavoidable impurities,
wherein a structure consists of, a ferrite, a bainite, and an other phase, the other phase includes one or more of a pearlite, a residual austenite, and a martensite, an area ratio of the ferrite is 80% or more and less than 95%, an area ratio of a non-recrystallization ferrite in the ferrite is 1% or more and less than 10%, an area ratio of the bainite is 5% to 20%, a total amount of the other phase is less than 8%, an equivalent circle diameter of a carbonitride including one or both of Nb and Ti is 1 nm or more and 10 nm or less, and a tensile strength is 590 MPa or more, said method comprising:
heating a slab having a composition consisting of: C: 0.020% or more and 0.080% or less; Si: 0.20% or more and 1.00% or less; Mn: 0.80% or more and 2.30% or less; P: 0.0050% or more and 0.1500% or less; S: 0.0020% or more and 0.0150% or less; Al: 0.010% or more and 0.100% or less; N: 0.0010% or more and 0.0100% or less; one or more of Nb and Ti which satisfy a requirement of 0.005%≤Nb+Ti<0.030%; and a remainder including Fe and unavoidable impurities, to 1150° C. or more and 1280° C. or less;
finishing a finish rolling under a temperature of $Ar_3$° C. or more and 1050° C. or less;
pickling and then cold-rolling a hot-rolled steel sheet, which is coiled under a temperature range of 450° C. or more and 650° C. or less, under a reduction of 40% or more and 70% or less; thereafter
heating into a temperature range of $Ac_1$° C. or more and $(Ac_1+40)$ ° C. or less under a rate of 2° C./sec or more and 4° C./sec or less;
annealing the cold-rolled steel sheet under the temperature range of $Ac_1$° C. or more and $(Ac_1+40)$° C. or less and under a holding time of 10 sec or more and 200 sec or less; and
primary cooling immediately after the annealing into a steel sheet temperature range of 600° C. or more and 720° C. or less under a cooling rate of 10° C./sec or less in a course from the annealing to arriving at a normal temperature, wherein the $Ar_3$° C. and the $Ac_1$° C. is a $Ar_3$ transformation temperature and a $Ac_1$ transformation temperature, respectively, calculated from Expressions 1 and 2, $$Ar_3=910-325\times[C]+33\times[Si]+287\times[P]+40\times[Al]-92\times([Mn]+[Mo]+[Cu])-46\times([Cr]+[Ni]) \quad \text{(Expression 1)},$$

$$Ac_1=723+212\times[C]-10.7\times[Mn]+29.1\times[Si] \quad \text{(Expression 2), and}$$

elements noted in brackets represents an amount of the elements by mass %, respectively.

2. A method for manufacturing a plated steel sheet, comprising:

plating the cold-rolled steel sheet manufactured by the method according to claim 1 after the annealing and the cooling.

3. The method for manufacturing a plated steel sheet according to claim 2, comprising:

heat treating the plated steel sheet under a temperature range of 450° C. or more and 600° C. or less with 10 seconds or longer.

4. A method for manufacturing a cold-rolled steel sheet, the cold-rolled steel sheet consisting of, by mass %:

C: 0.020% or more and 0.080% or less;
Si: 0.20% or more and 1.00% or less;
Mn: 0.80% or more and 2.30% or less;
P: 0.0050% or more and 0.1500% or less;
S: 0.0020% or more and 0.0150% or less;
Al: 0.010% or more and 0.100% or less;
N: 0.0010% or more and 0.0100% or less;
one or more of Nb and Ti which satisfy a requirement of $0.005\% \leq Nb+Ti<0.030\%$; and
a remainder including Fe and unavoidable impurities, wherein a structure comprises a ferrite and a bainite and optionally an other phase, wherein the optional other phase, when present, includes one or more of a pearlite, a residual austenite, and a martensite, said optional other phase, when present, is present in a total amount of up to less than 8%, an area ratio of the ferrite is 80% or more and less than 95%, an area ratio of a non-recrystallization ferrite in the ferrite is 1% or more and less than 10%, an area ratio of the bainite is 5% to 20%, an equivalent circle diameter of a carbonitride including one or both of Nb and Ti is 1 nm or more and 10 nm or less, and a tensile strength is 590 MPa or more, said method comprising:

heating a slab having a composition consisting of: C: 0.020% or more and 0.080% or less; Si: 0.20% or more and 1.00% or less; Mn: 0.80% or more and 2.30% or less; P: 0.0050% or more and 0.1500% or less; S: 0.0020% or more and 0.0150% or less; Al: 0.010% or more and 0.100% or less; N: 0.0010% or more and 0.0100% or less; one or more of Nb and Ti which satisfy a requirement of $0.005\% \leq Nb+Ti<0.030\%$; and a remainder including Fe and unavoidable impurities to 1150° C. or more and 1280° C. or less;

finishing a finish rolling under a temperature of $Ar_3$° C. or more and 1050° C. or less;

pickling and then cold-rolling a hot-rolled steel sheet, which is coiled under a temperature range of 450° C. or more and 650° C. or less, under a reduction of 40% or more and 70% or less; thereafter heating into a temperature range of $Ac_1$° C. or more and $(Ac_1+40)$° C. or less under a rate of 2° C./sec or more and 4° C./sec or less;

annealing the cold-rolled steel sheet under the temperature range of $Ac_1$° C. or more and $(Ac_1+40)$° C. or less and under a holding time of 10 sec or more and 200 sec or less; and primary cooling immediately after the annealing into a steel sheet temperature range of 600° C. or more and 720° C. or less under a cooling rate of 10° C./sec or less in a course from the annealing to arriving at a normal temperature, wherein the $Ar_3$° C. and the $Ac_1$° C. is a $Ar_3$ transformation temperature and a $Ac_1$ transformation temperature, respectively, calculated from Expressions 1 and 2, $$Ar_3=910-325\times[C]+33\times[Si]+287\times[P]+40\times[Al]-92\times([Mn]+[Mo]+[Cu])-46\times([Cr]+[Ni]) \quad \text{(Expression 1)},$$

$$Ac_1=723+212\times[C]-10.7\times[Mn]+29.1\times[Si] \quad \text{(Expression 2), and}$$

elements noted in brackets represents an amount of the elements by mass %, respectively.

5. A method for manufacturing a plated steel sheet, comprising:

plating the cold-rolled steel sheet manufactured by the method according to claim 4 after the annealing and the cooling.

6. The method for manufacturing a plated steel sheet according to claim 5, comprising:

heat treating the plated steel sheet under a temperature range of 450° C. or more and 600° C. or less with 10 seconds or longer.

* * * * *